(12) United States Patent
Ha et al.

(10) Patent No.: US 7,286,187 B2
(45) Date of Patent: Oct. 23, 2007

(54) ADAPTIVE DE-INTERLACING METHOD AND APPARATUS BASED ON PHASE CORRECTED FIELD, AND RECORDING MEDIUM STORING PROGRAMS FOR EXECUTING THE ADAPTIVE DE-INTERLACING METHOD

(75) Inventors: Tae-hyeun Ha, Seoul (KR); Jae-seok Kim, Gyeonggi-do (KR); Jun-ho Sung, Seoul (KR); Seong-joo Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 519 days.

(21) Appl. No.: 10/879,724

(22) Filed: Jun. 30, 2004

(65) Prior Publication Data

US 2005/0030423 A1 Feb. 10, 2005

(30) Foreign Application Priority Data

Aug. 4, 2003 (KR) .................... 10-2003-0053888

(51) Int. Cl.
*H04N 11/00* (2006.01)
(52) U.S. Cl. ...................................... 348/452; 348/448
(58) Field of Classification Search ................ 348/448, 348/452, 700, 701, 607, 910; 382/107, 300
See application file for complete search history.

(56) References Cited

U.S. PATENT DOCUMENTS

| | | | |
|---|---|---|---|
| 5,682,205 A | 10/1997 | Sezan et al. | |
| 6,243,140 B1 * | 6/2001 | Suzuki | 348/448 |
| 6,262,774 B1 * | 7/2001 | Schu et al. | 348/448 |
| 6,990,148 B2 * | 1/2006 | Yang | 375/240.16 |
| 2002/0171759 A1 | 11/2002 | Handjojo et al. | |

FOREIGN PATENT DOCUMENTS

| | | |
|---|---|---|
| JP | 08-163573 A | 6/1996 |
| KR | 2001-026089 A | 4/2001 |
| KR | 2002-011247 A | 2/2002 |
| KR | 2002-026042 A | 4/2002 |

OTHER PUBLICATIONS

Renxiang Li, et al., "Reliable Motion Detection/Compensation for Interlaced Sequences and its Applications to Deinterlacing", IEEE Transactions on Circuits and Sytems for Video Technology, vol. 10, No. 1, Feb. 2000.

* cited by examiner

*Primary Examiner*—Victor R. Kostak
(74) *Attorney, Agent, or Firm*—Sughrue Mion Pllc.

(57) ABSTRACT

There is disclosed an adaptive de-interlacing method and apparatus based on a phase corrected field of an input interlaced picture signal, and a recording medium storing computer programs for executing the method. The method includes: generating a phase corrected $k^{th}$ field by compensating a phase of the $k^{th}$ field of the input interlaced picture signal by 1 line frequency; calculating a first motion vector between the phase corrected $k^{th}$ field and the $(k-1)^{th}$ field of the interlaced picture signal; calculating a second motion vector between the $(k-1)^{th}$ field and the $(k+1)^{th}$ field of the interlaced picture signal; and determining whether there is motion of the input picture based on the first and second motion vector values, and generating a $k^{th}$ progressive frame based on the result and the $k^{th}$ field. Thus, a serration phenomenon is minimized after de-interlacing by more exactly detecting the motion information of a corresponding inserted field.

23 Claims, 7 Drawing Sheets

ADAPTIVE DE-INTERLACING METHOD AND APPARATUS BASED ON PHASE CORRECTED FIELD, AND RECORDING MEDIUM STORING PROGRAMS FOR EXECUTING THE ADAPTIVE DE-INTERLACING METHOD

BACKGROUND OF THE INVENTION

This application claims the priority of Korean Patent Application No. 2003-53888, filed on Aug. 4, 2003, in the Korean Intellectual Property Office, the disclosure of which is incorporated herein in its entirety by reference.

1. Field of the Invention

The present invention relates to an apparatus for and a method of converting a picture format, and more particularly, to an adaptive de-interlacing apparatus and method based on a phase corrected field corresponding to a predetermined interlaced field by which an input interlaced picture signal is converted into a progressive picture signal.

2. Description of the Related Art

A general television picture signal is compressed in the frequency domain using an interlacing method to form one frame with two fields. However, lately, a picture is commonly displayed on a personal computer (PC) and a high definition television (HDTV) using a progressive method. Therefore, to display an interlaced picture, a progressive scanning should be performed to generate picture lines, which are omitted in the interlaced picture, with an optional method. This is realized using a de-interlacing method.

Figure 1:
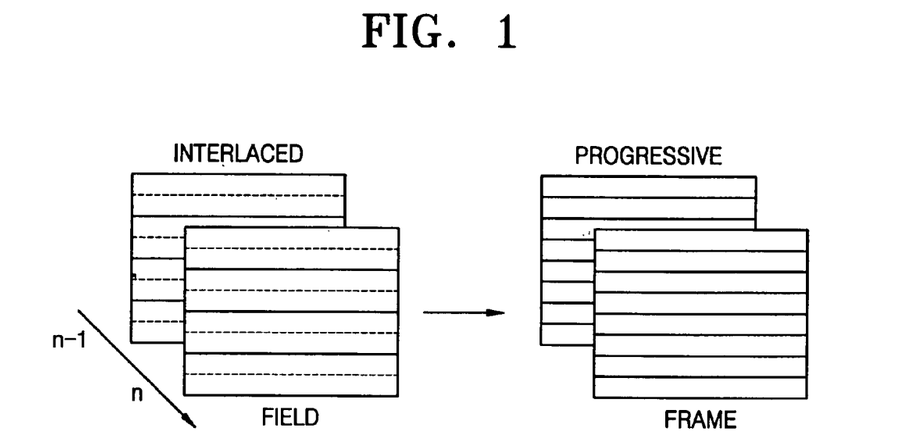
FIG. 1 is a drawing to describe a conventional video data de-interlacing method.

FIG. 1 is a drawing to describe a conventional video data de-interlacing method.

With reference to FIG. 1, during de-interlacing, a field including only all vertically odd or even samples is converted into a frame. At this time, an output frame $F_0(\vec{x},n)$ is defined by Equation, 1.

$$F_0(\vec{x},n) = \begin{cases} F(\vec{x},n) & (y mod 2 = n mod 2), \\ F_i(\vec{x},n) & \text{otherwise} \end{cases} \quad \text{[Equation 1]}$$

where $\vec{x}$ denotes a spatial position, and n is a field number. Also, $F(\vec{x},n)$ is an input field, and $F_i(\vec{x},n)$ is an interpolated pixel.

Figure 2:
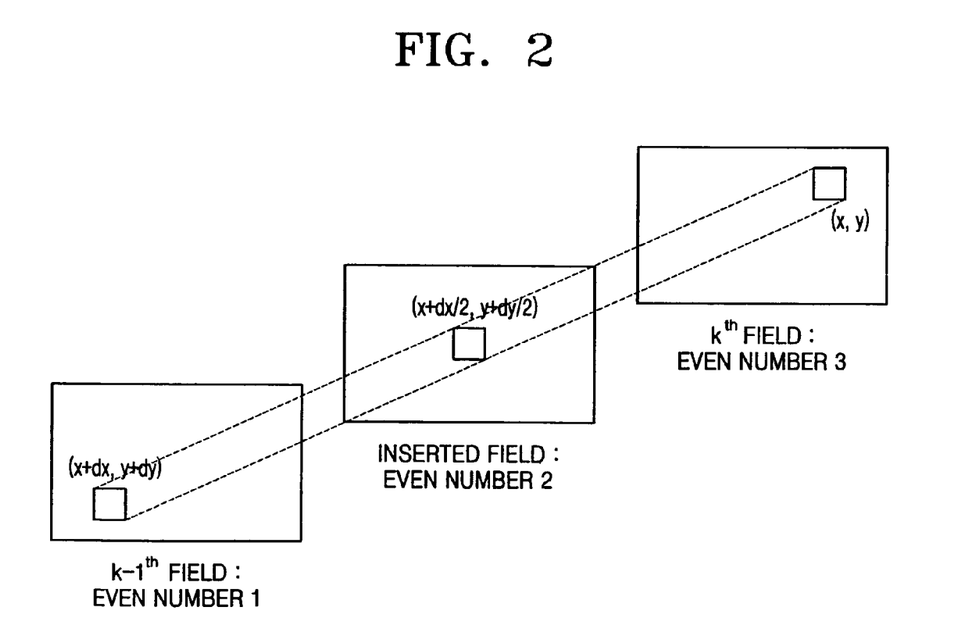
FIG. 2 shows a conventional de-interlacing method based on motion compensation.

FIG. 2 shows a conventional de-interlacing method based on motion compensation. In this method, motion information of a picture is extracted to interpolate vacant lines of a present field, and then the vacant lines of the present field are interpolated using pixels of a preceding field or a next preceding field based on the extracted motion information.

In the de-interlacing method based on an MC, it is assumed that a motion vector between adjacent even parity fields or adjacent odd parity fields has uniform velocity, and then a field is inserted in the middle position between two adjacent even or odd parity fields.

The video line interpolating method using an MC is disclosed in U.S. Pat. No. 6,233,018.

However, since a moving picture does not always have the uniform velocity, and the position of an inserted field is not right middle position between two adjacent fields with the same phase, a serration phenomenon appears, which degrades the quality of the moving picture.

SUMMARY OF THE INVENTION

The present invention provides an adaptive de-interlacing method and apparatus to exactly detect motion information and minimize a serration phenomenon after de-interlacing, by using a phase corrected field which corrects a phase of a corresponding inserted field for converting an input interlaced picture signal to a progressive signal, and also provides a recording medium storing computer programs for executing the method.

According to an aspect of the present invention, there is provided an adaptive de-interlacing method based on a phase corrected field of an input interlaced picture signal, including: generating a phase corrected $k^{th}$ field by compensating a phase of the $k^{th}$ field of the input interlaced picture signal by 1 line frequency; calculating a first motion vector between the phase corrected $k^{th}$ field and the $(k-1)^{th}$ field of the interlaced picture signal; calculating a second motion vector between the $(k-1)^{th}$ field and the $(k+1)^{th}$ field of the interlaced picture signal; and determining whether there is motion of the input picture based on the first and second motion vector values, and generating a $k^{th}$ progressive frame based on the result and the $k^{th}$ field.

Also, the method may further include: generating an adaptive motion vector based on the first and second motion vectors; generating an adaptive motion compensated field based on the generated adaptive motion vector, the $(k-1)^{th}$ field, and the $(k+1)^{th}$ field; and calculating a correlation between the first and second motion vectors, and if the calculated correlation is larger than the critical value, generating a progressive frame based on the adaptive motion vector.

According to another aspect of the present invention, there is provided an adaptive de-interlacing apparatus based on a phase corrected field of an input interlaced picture signal, including: a phase corrector, which generates a phase corrected $k^{th}$ field by compensating a phase of the $k^{th}$ field of the input interlaced picture signal by 1 line frequency; a first motion vector calculator, which calculates a first motion vector between the phase corrected $k^{th}$ field and the $(k-1)^{th}$ field of the interlaced picture signal; a second motion vector calculator which calculates a second motion vector between the $(k-1)^{th}$ field and the $(k+1)^{th}$ field of the interlaced picture signal; and a picture converter, which determines whether there is motion of the input picture based on the first and second motion vector values, and generates a $k^{th}$ progressive frame based on the result and the $k^{th}$ field.

According to another aspect of the present invention, there is provided a recording medium storing computer programs for executing an adaptive de-interlacing method based on a phase corrected field of an input interlaced picture signal, the method including: generating a phase corrected $k^{th}$ field by compensating a phase of the $k^{th}$ field of the input interlaced picture signal by 1 line frequency; calculating a first motion vector between the phase corrected $k^{th}$ field and the $(k-1)^{th}$ field of the interlaced picture signal; calculating a second motion vector between the $(k-1)^{th}$ field and the $(k+1)^{th}$ field of the interlaced picture signal; and determining whether there is motion of the input picture based on the first and second motion vector values, and generating a $k^{th}$ progressive frame based on the result and the $k^{th}$ field.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 3:
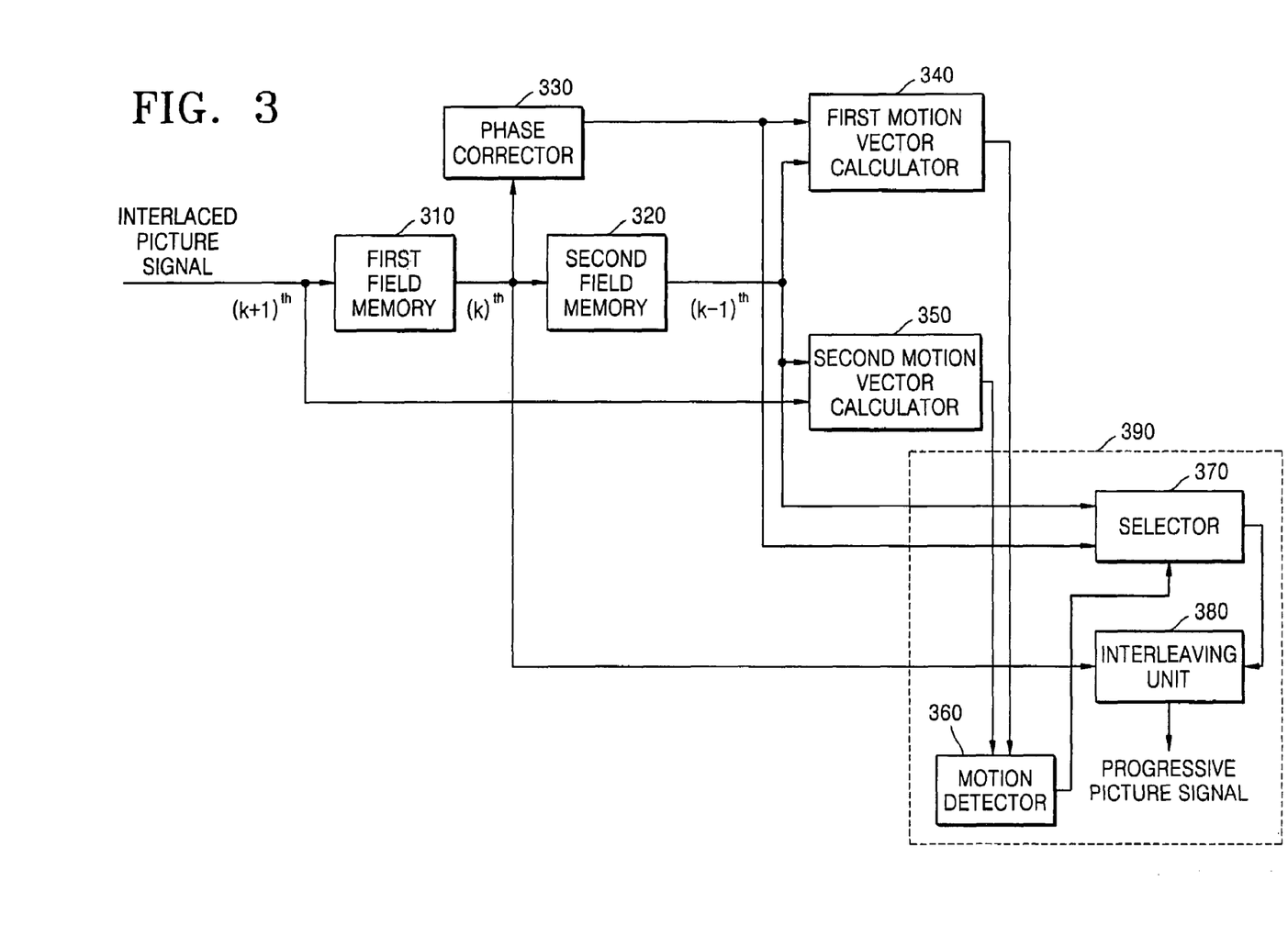
FIG. 3 is a block diagram of an adaptive de-interlacing apparatus according to an embodiment of the present invention.

FIG. 3 is a block diagram of an adaptive de-interlacing apparatus according to the present invention.

With reference to FIG. 3, the de-interlacing apparatus according to the present invention converts an input interlaced picture signal to a progressive picture signal, and includes a first field memory 310, a second field memory 320, a phase corrector 330, a first motion vector calculator 340, a second motion vector calculator 350, and a picture converter 390.

The picture converter 390 includes a motion detector 360, a selector 370, and an interleaving unit 380.

A $(k+1)^{th}$ field of an interlaced picture signal is input to the first field memory 310, and the first field memory 310 and the second field memory 320 are used for generating a $k^{th}$ field and a $(k-1)^{th}$ field, respectively.

The phase corrector 330 generates a phase corrected $k^{th}$ field by delaying an output of the first field memory 310, that is, a phase of a $k^{th}$ field by 1-horizontal period. When the $k^{th}$ field is an odd field, the phase corrected $k^{th}$ field is an even field opposite to the phase of the $k^{th}$ field.

The first motion vector calculator 340 calculates a first motion vector MV1 =(dx1, dy1) between the $(k-1)^{th}$ field, which is an output by the second field memory 320, and the phase corrected $k^{th}$ field, which is an output by the phase corrector 330, and then outputs the first motion vector to the motion detector 360.

The second motion vector calculator 350 calculates a second motion vector MV2 =(dx2, dy2) between an input $(k+1)^{th}$ field and a $(k-1)^{th}$ field, which is an output of the second field memory 320, and then outputs the second motion vector to the motion detector 360.

The motion detector 360 determines whether there is motion of an input picture by comparing the first and second motion vector values respectively calculated in the first motion vector calculator 340 and second motion vector calculator 350 to a predetermined critical value, and then generates motion information according to the determined result, and finally outputs the motion information to the selector 370. In the present embodiment, if one of the first and second motion vector values is larger than a predetermined critical value, it is determined that there is motion of an input picture. Selectively, it is also possible to determine whether there is motion of an input picture by using one of the first and the second motion vectors.

The selector 370 outputs one of the $(k-1)^{th}$ field from the second field memory 320 input based on the motion information input from the motion detector 360 and the phase corrected $k^{th}$ field from the phase corrector 330 to the interleaving unit 380.

For example, when there is no motion of an input picture, the selector 370 outputs the $(k-1)^{th}$ field from the second field memory 320.

Also, when there is motion of an input picture, the selector 370 outputs the phase corrected $k^{th}$ field from the phase corrector 330.

The interleaving unit 380 generates and outputs a $k^{th}$ progressive frame based on the field signal input from the selector 370 and the $k^{th}$ field signal input from the first field memory 310.

For example, if the $k^{th}$ field is an odd field and there is motion of an input picture, the interleaving unit 380 generates and outputs a progressive frame based on the $k^{th}$ field input from the first field memory 310 and the phase corrected $k^{th}$ field from the phase corrector 330, that is, the even fields.

Figure 4:
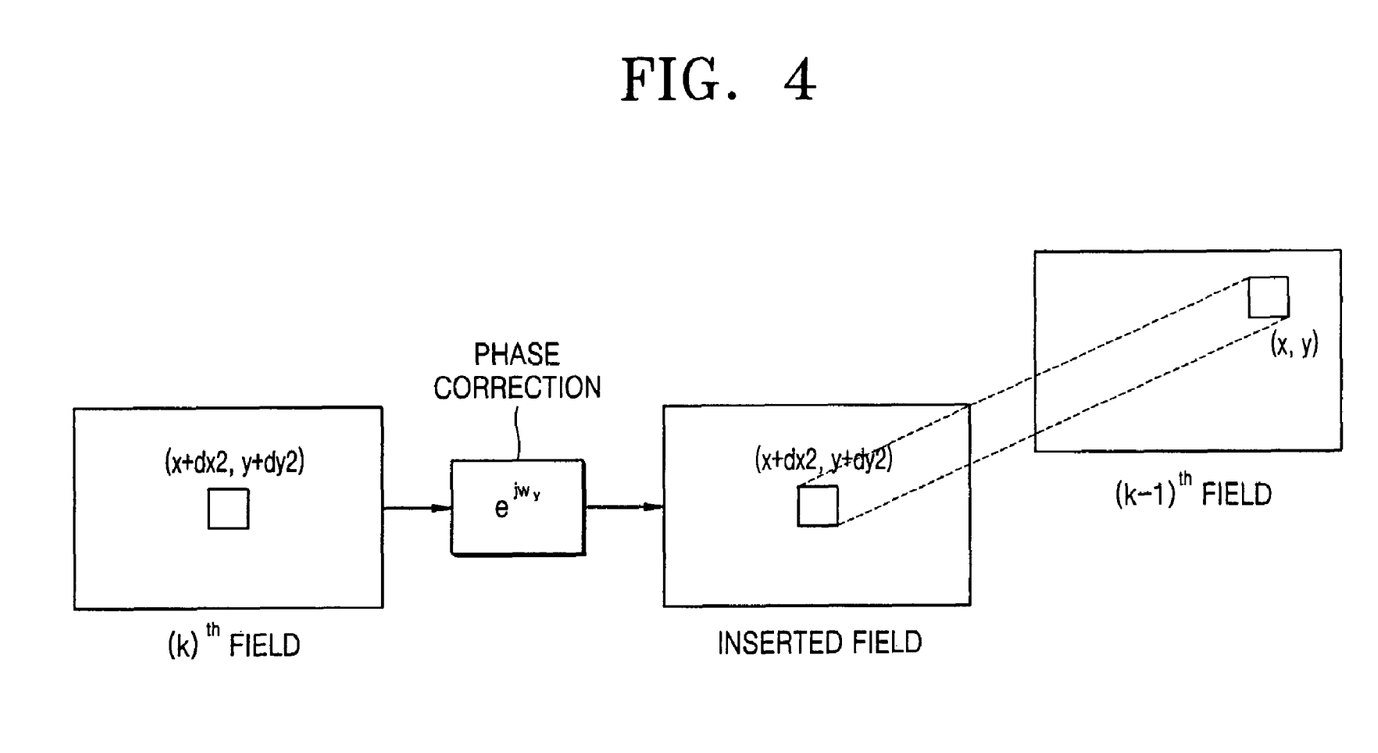
FIG. 4 shows a phase correction procedure of a $k^{th}$ field and a calculation procedure of a motion vector between the phase corrected $k^{th}$ field and a $(k-1)^{th}$ field, according to the present invention.

FIG. 4 shows a phase correction procedure of a $k^{th}$ field output from the first field memory 310, which is performed in the phase corrector 330 and the first motion vector calculator 340 shown in FIG. 3, and shows a calculation procedure of a motion vector between the phase corrected $k^{th}$ field and the $(k-1)^{th}$ field.

Figure 5:
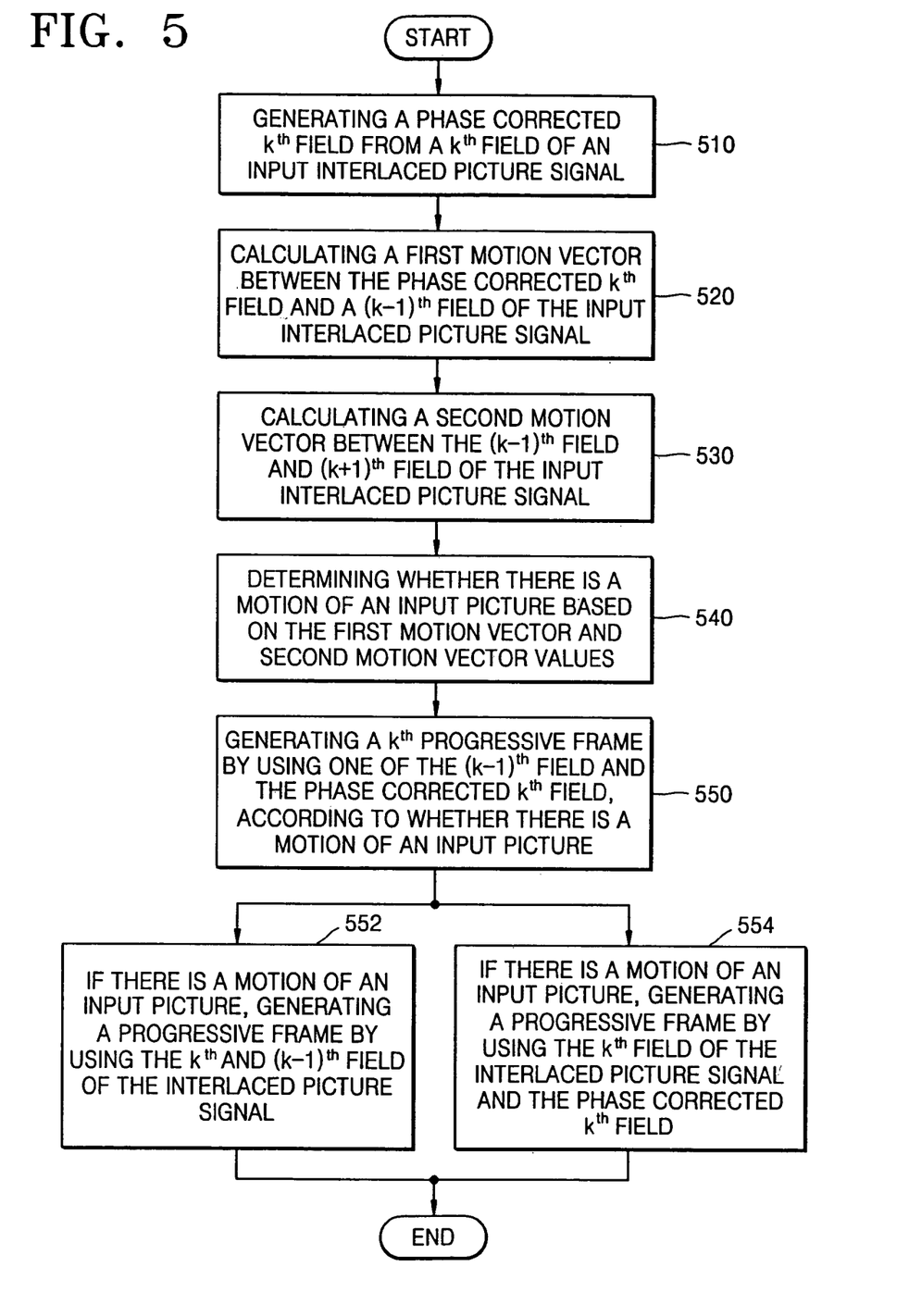
FIG. 5 is a flowchart of an adaptive de-interlacing method according to an embodiment of the present invention.

FIG. 5 is a flowchart of an adaptive de-interlacing method performed in the adaptive de-interlacing apparatus shown in FIG. 3.

A phase corrected $k^{th}$ field is generated in step 510 by correcting a phase of a $k^{th}$ field of an input interlaced picture signal by 1 line frequency. For example, if the $k^{th}$ field of the input interlaced picture signal is an odd field, the phase corrected $k^{th}$ field is an even field opposite to the phase of the $k^{th}$ field.

A first motion vector between the phase corrected $k^{th}$ field generated in step 510 and the $(k-1)^{th}$ field of the input interlaced picture signal is calculated in step 520.

A second motion vector between the $(k-1)^{th}$ field and $(k+1)^{th}$ field of the input interlaced picture signal is calculated in step 530.

In step 540, it is determined whether there is motion of the input picture based on the calculated first and second motion vector values. In the present embodiment, if one of the first and second motion vector values is larger than a predetermined critical value, it is determined that there is motion of the input picture. Selectively, it is also possible to determine whether there is motion of the input picture by using one of the first and the second motion vectors.

A $k^{th}$ progressive frame is generated in step 550 by using one of the $(k-1)^{th}$ field and the phase corrected $k^{th}$ field, according to whether there is motion of the input picture as determined in step 540.

When the $k^{th}$ field is an odd field and there is no motion of the input picture, a progressive frame is generated and output in step 552 by using the $k^{th}$ field and the $(k-1)^{th}$ field which is an even field.

When the $k^{th}$ field is an odd field and there is motion of the input picture, a progressive frame is generated and output in step 554 by using the $k^{th}$ field and the phase corrected $k^{th}$ field, that is, an even field.

Figure 6:
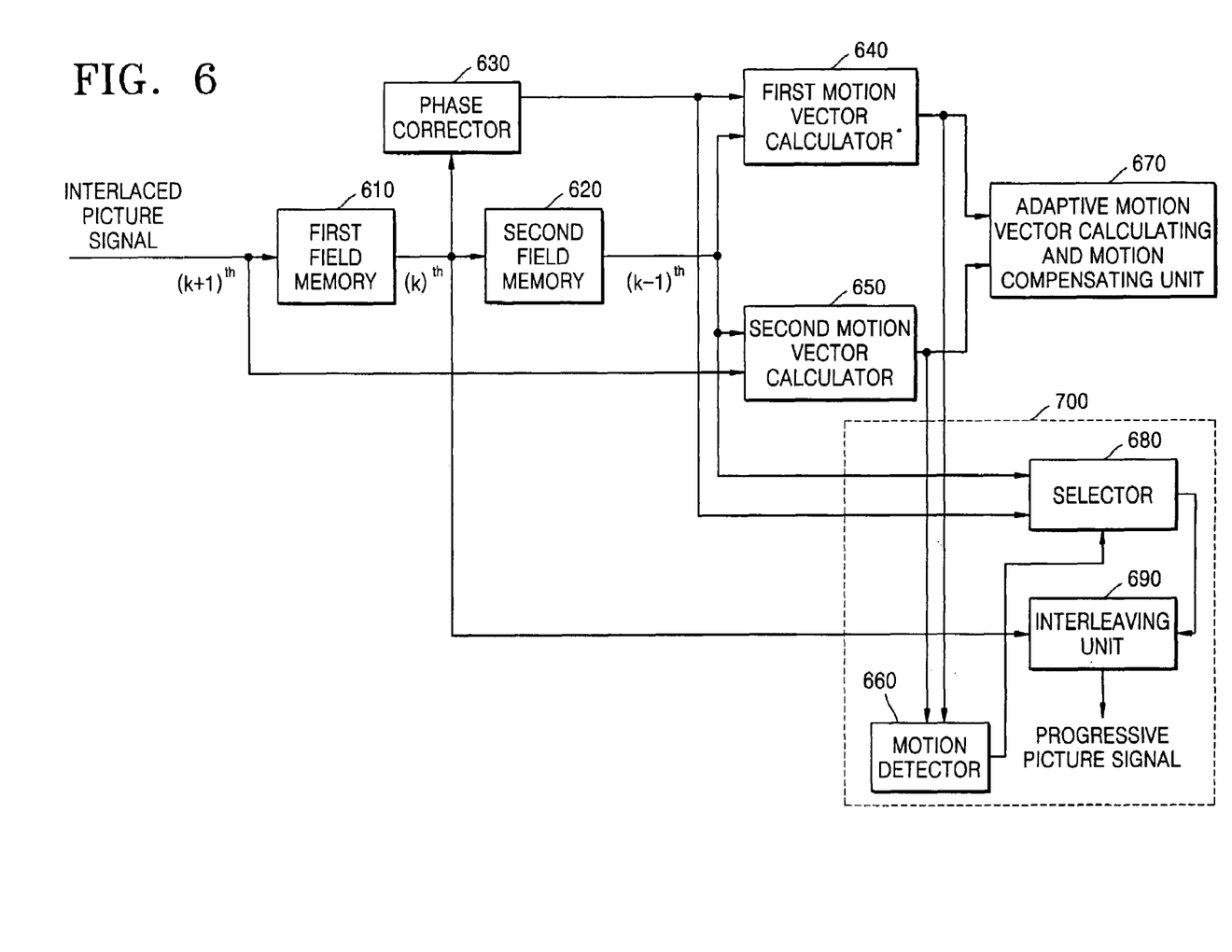
FIG. 6 is a block diagram of an adaptive de-interlacing apparatus according to another embodiment of the present invention.

FIG. 6 is a block diagram of an adaptive de-interlacing apparatus according to another embodiment of the present invention.

With reference to FIG. 6, a de-interlacing apparatus according to the present invention converts an input interlaced picture signal to a progressive picture signal, and includes a first field memory 610, a second field memory 620, a phase corrector 630, a first motion vector calculator 640, a second motion vector calculator 650, an adaptive motion vector calculating and motion compensating unit 670, and a picture converter 700.

The picture converter 700 further includes a motion detector 660, a selector 680, and an interleaving unit 690.

Since the first field memory 610, the second field memory 620, and the phase corrector 630 of FIG. 6 performs the same operation as the corresponding first field memory 310, second field memory 320, and phase corrector 330 of FIG. 3, detailed descriptions thereof will be omitted.

The first motion vector calculator 640 calculates a first motion vector MV1=(dx1, dy1) between a (k−1)$^{th}$ field, which is an output of the second field memory 620, and a phase corrected k$^{th}$ field, which is an output of the phase corrector 630, and then outputs, the first motion vector to the motion detector 660 and the adaptive motion vector calculating and motion compensating unit 670.

The second motion vector calculator 650 calculates a second motion vector MV2=(dx2, dy2) between an input (k+1)$^{th}$ field and a (k−1)$^{th}$ field, which is an output of the second field memory 620, and then outputs the second motion vector to the motion detector 660 and the adaptive motion vector calculating and motion compensating unit 670. The second motion vector calculator 650 also outputs the input (k+1)$^{th}$ field signal and the (k−1)$^{th}$ field signal, which is an output of the second field memory 620, to the adaptive motion vector calculating and motion compensating unit 670.

The motion detector 660 determines whether there is motion of the input picture and whether the first and second motion vectors are valid, based on the input first and second motion vector values, generates motion information according to the determination result, and finally outputs the motion information to the selector 680.

In the present embodiment, if one of the first and second motion vector values is larger than a predetermined critical value, it is determined that there is motion of the input picture. Selectively, it is also possible to determine whether there is motion of the input picture by using one of the first and second motion vectors.

When it is determined that there is motion, by calculating the correlation between the first and second motion vectors, it is determined whether the first and second motion vectors are valid. In the present embodiment, if the correlation is larger than the predetermined critical value, it is determined that the first and second motion vectors are valid.

The adaptive motion vector calculating and motion compensating unit 670 calculates an adaptive motion vector (dx2/w, dy2/w) based on the input first motion vector MV1=(dx1, dy1) and second motion vector MV2 =(dx2, dy2), where w is calculated according to Equation 2.

$$w = \frac{\sqrt{dx1^2 + dy1^2}}{\sqrt{dx2^2 + dy2^2}}$$ [Equation 2]

The adaptive motion vector calculating and motion compensating unit 670 generates an adaptive motion compensated field by performing a motion compensation based on the calculated adaptive motion vector and the input (k+1)$^{th}$ field and (k−1)$^{th}$ field information, and then outputs this to the selector 680.

Figure 7:
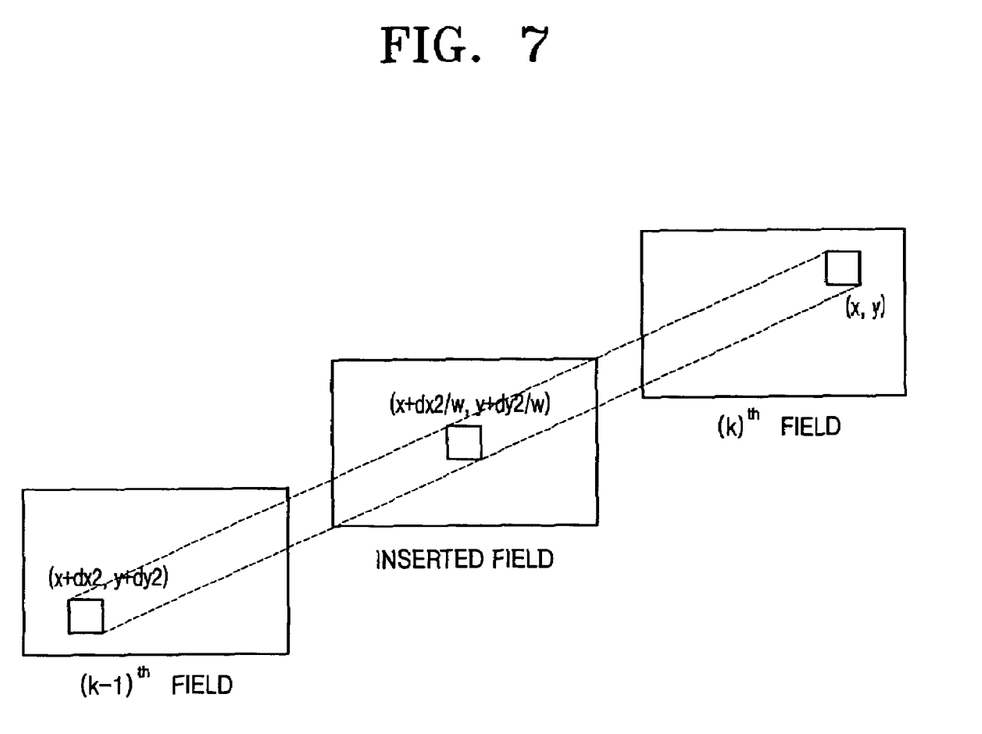
FIG. 7 shows an adaptive motion vector calculation procedure and an adaptive motion compensation procedure, according to the present invention.

FIG. 7 shows an adaptive motion vector calculation and adaptive motion compensation method performed in the adaptive motion vector calculating and motion compensating unit 670.

The selector 680 outputs one of the (k−1)$^{th}$ field from the second field memory 620, the phase corrected k$^{th}$ field from the phase corrector 630, and the adaptive motion compensated field from the adaptive motion vector calculating and motion compensating unit 670 to the interleaving unit 690 based on the motion information input from the motion detector 660.

For example, if the motion information shows that there is no motion of the input picture, the selector 680 outputs the (k−1)$^{th}$ field from the second field memory 620.

Also, if the motion information shows that there is motion of the input picture and the first and second motion vectors are not valid, the selector 680 outputs the phase corrected k$^{th}$ relative field from the phase corrector 630.

Also, if the motion information shows that there is motion of the input picture and the first and second motion vectors are valid, the selector 680 outputs the adaptive motion compensated field input from the adaptive motion vector calculating and motion compensating unit 670.

The interleaving unit 690 generates and outputs a k$^{th}$ progressive frame based on the field signal input from the selector 680 and the k$^{th}$ field signal input from the first field memory 610.

For example, when the k$^{th}$ field is an odd field and there is no motion of the input picture, the interleaving unit 690 generates and outputs a k$^{th}$ progressive frame by using the k$^{th}$ field input from the first field memory 610 and the (k−1)$^{th}$ even field input from the second field memory 620.

Also, when the k$^{th}$ field is an odd field and there is motion of the input picture and the first and second motion vectors are not valid, the interleaving unit 690 generates and outputs a k$^{th}$ progressive frame by using the k$^{th}$ field input from the first field memory 610 and the phase corrected k$^{th}$ field, which is an even field, input from the phase corrector 630.

Also, when the k$^{th}$ field is an odd field and there is motion of the input picture and the first and second motion vectors are valid, the interleaving unit 690 generates and outputs a k$^{th}$ progressive frame by using the k$^{th}$ field input from the first field memory 610 and the adaptive motion compensated field, which is an even field, input from the adaptive motion vector calculating and motion compensating unit 670.

Figure 8:
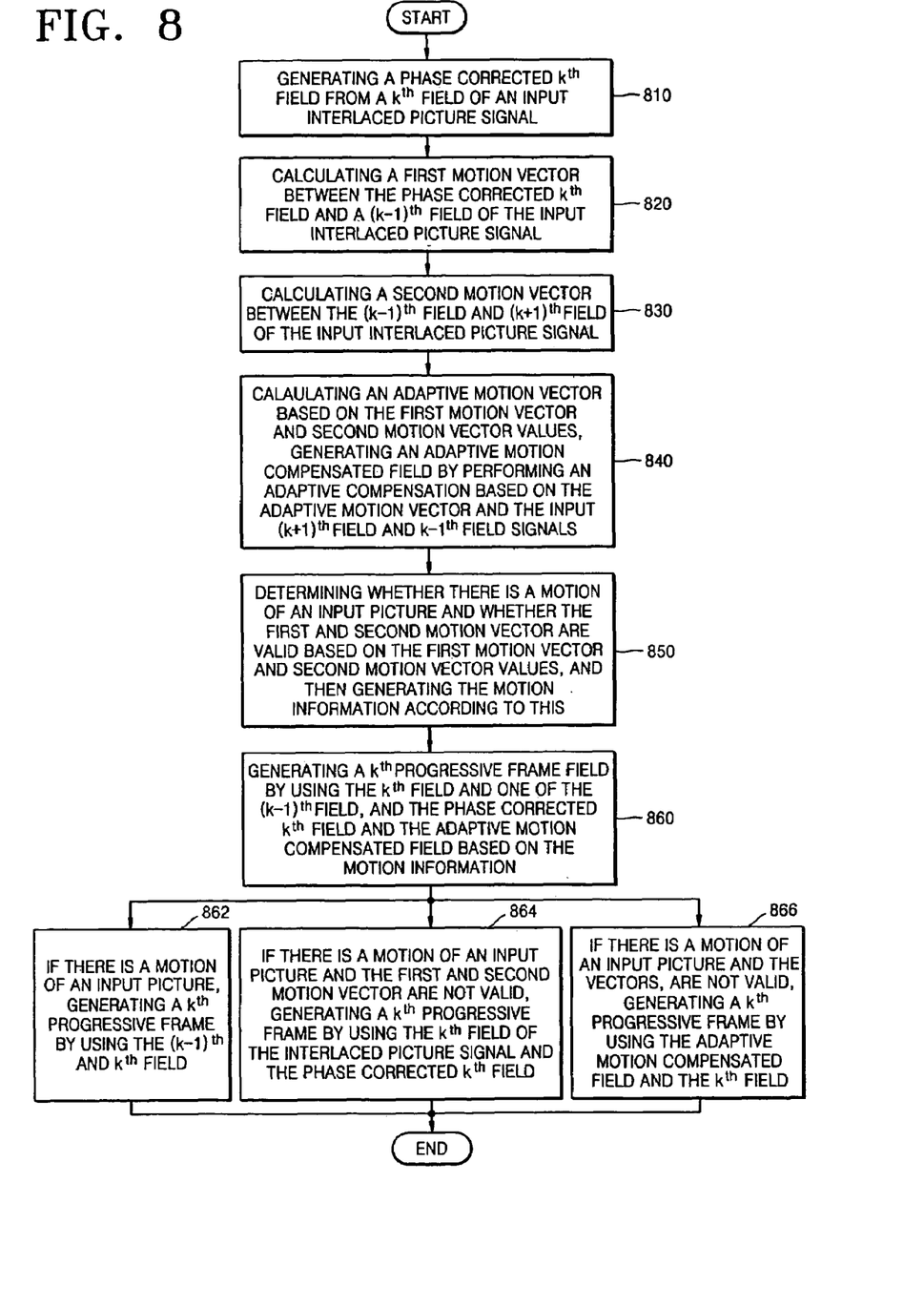
FIG. 8 is a flowchart of an adaptive de-interlacing method according to another embodiment of the present invention.

FIG. 8 is a flowchart of an adaptive de-interlacing method performed in the de-interlacing apparatus shown in FIG. 6.

A phase corrected k$^{th}$ field is generated in step 810 by correcting a phase of a k$^{th}$ field of an input picture signal by 1 line frequency. For example, if the k$^{th}$ field of the input interlaced picture signal is an odd field, the phase corrected k$^{th}$ field is an even field opposite to the phase of the k$^{th}$ field.

A motion vector between the phase corrected k$^{th}$ field generated in step 810 and the (k−1)$^{th}$ field of the input interlaced picture signal, that is, a first motion vector MV1=(dx1, dy1) is calculated in step 820.

A motion vector between the (k−1)$^{th}$ field and (k+1)$^{th}$ field of the input interlaced picture signal, that is, a second motion vector MV2=(dx2, dy2) is calculated in step 830.

An adaptive motion vector (dx2/w, dy2/w) is calculated in step 840 based on the first motion vector MV1=(dx1, dy1)

and the second motion vector MV2=(dx2, dy2), where w is calculated according to Equation 2. Also, an adaptive motion compensated field is generated by performing a motion compensation based on the calculated adaptive motion vector and the input $(k+1)^{th}$ field signal and $(k-1)^{th}$ field signal.

In step 850, it is determined whether there is motion of the input picture and whether the first and second motion vectors are valid, based on the first and second motion vector values calculated in steps 820 and 830, and the motion information according to the determination result is also generated in step 850.

In the present embodiment, if one of the first and second motion vector values is larger than a predetermined critical value, it is determined that there is motion of the input picture. Selectively, it is also possible to determine whether there is motion of the input picture by using one of the first and second motion vectors.

When it is determined that there is motion, by calculating the correlation between the first and second motion vectors, it is determined whether the first and second motion vectors are valid. In the present embodiment, if the correlation is larger than the predetermined critical value, it is determined that the first and second motion vectors are valid.

A $k^{th}$ progressive frame is generated in step 860 by using the $k^{th}$ field and one of the $(k-1)^{th}$ field, the phase corrected $k^{th}$ field, and the adaptive motion compensated field, based on the motion information generated in step 850.

When the $k^{th}$ field is an odd field and there is no motion of the input picture, a $k^{th}$ progressive frame is generated in step 862 by using the $k^{th}$ field and the $(k-1)^{th}$ field which is an even field.

When the $k^{th}$ field is an odd field and there is motion of the input picture and the first and second motion vectors are not valid, a $k^{th}$ progressive frame is generated in step 864 by using the $k^{th}$ field and the phase corrected $k^{th}$ field which is an even field.

When the $k^{th}$ field is an odd field and there is motion of the input picture and the first and second motion vectors are valid, a $k^{th}$ progressive frame is generated in step 866 by using the $k^{th}$ field and the adaptive motion compensated field which is an even field.

The present invention may be embodied in a general-purpose computer by running a program from a computer readable medium, including but not limited to storage media such as magnetic storage media (ROMs, RAMs, floppy disks, magnetic tapes, etc.), optically readable media (CD-ROMs, DVDs, etc.), and carrier waves (transmission over the internet). The present invention may be embodied as a computer readable medium having stored thereon a computer readable program code unit that can be executed by computer systems connected via a network during distributed processing.

As described above, according to the present invention, it is possible to minimize the serration phenomenon after de-interlacing by detecting motion of an input picture based on a phase corrected field which corrects a phase of a corresponding inserted field, and also by more exactly detecting the motion information of a corresponding inserted field.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An adaptive de-interlacing method based on a phase corrected field of an input interlaced picture signal comprising:
   generating a phase corrected $k^{th}$ field of the input interlaced picture signal by compensating a phase of the $k^{th}$ field of the input interlaced picture signal by 1 line frequency;
   calculating a first motion vector between the phase corrected $k^{th}$ field and a $(k-1)^{th}$ field of the interlaced picture signal;
   calculating a second motion vector between the $(k-1)^{th}$ field and a $(k+1)^{th}$ field of the interlaced picture signal; and
   determining whether there is motion of an input picture based on the first and second motion vector values, and generating a $k^{th}$ progressive frame based on a result of the motion determination and the $k^{th}$ field,
   where k comprises an integer.

2. The method of claim 1, wherein if one of the first and second motion vector values is larger than a predetermined critical value, it is determined that there is motion of the input picture, and then, a $k^{th}$ progressive frame is generated by using the phase corrected $k^{th}$ field and the $k^{th}$ field.

3. The method of claim 1, wherein if the first and second motion vector values are smaller than the predetermined critical value, it is determined that there is no motion of the input picture, and then, a $k^{th}$ progressive frame is generated by using the $(k-1)^{th}$ field and the $k^{th}$ field.

4. The method of claim 1, further comprising:
   generating an adaptive motion vector based on the first and second motion vectors.

5. The method of claim 4, wherein if the first motion vector is (dx1, dy1) and the second motion vector is (dx2, dy2), the adaptive motion vector is (dx2/w, dy2/w), where $$w = \frac{\sqrt{dx1^2 + dy1^2}}{\sqrt{dx2^2 + dy2^2}}.$$

6. The method of claim 4, further comprising:
   generating an adaptive motion compensated field based on the generated adaptive motion vector, the $(k-1)^{th}$ field, and the $(k+1)^{th}$ field.

7. The method of claim 4, wherein a correlation between the first and second motion vectors is calculated, and then, if the calculated correlation is larger than a predetermined critical value, a progressive frame is generated by using the adaptive motion vector.

8. The method of claim 1, wherein if the $k^{th}$ field is an odd field, the phase corrected $k^{th}$ field is an even field, and if the $k^{th}$ field is an even field, the phase corrected $k^{th}$ field is an odd field.

9. An adaptive de-interlacing apparatus based on a phase corrected field of an input interlaced picture signal, comprising:
   a phase corrector, which generates a phase corrected $k^{th}$ field by compensating a phase of a $k^{th}$ field of the input interlaced picture signal by 1 line frequency;
   a first motion vector calculator, which calculates a first motion vector between the phase corrected $k^{th}$ field and a $(k-1)^{th}$ field of the input interlaced picture signal;
   a second motion vector calculator, which calculates a second motion vector between the $(k-1)^{th}$ field and a $(k+1)^{th}$ field of the input interlaced picture signal; and a picture converter, which determines whether there is motion of an input picture based on the first and second motion vector values, and generates a $k^{th}$ progressive frame based on a result of the motion determination and the $k^{th}$ field, where k comprises an integer.

10. The apparatus of claim 9, wherein if one of the first and second motion vector values is larger than a predetermined critical value, the picture converter determines that there is motion of the input picture, and then generates a $k^{th}$ progressive frame by using the phase corrected $k^{th}$ field and the $k^{th}$ field.

11. The apparatus of claim 9, wherein if the first and second motion vector values are smaller than a predetermined critical value, the picture converter determines that there is no motion of the input picture, and then, generates a $k^{th}$ progressive frame by using the $(k-1)^{th}$ field and the $k^{th}$ field.

12. The apparatus of claim 9, further comprising:

an adaptive motion vector calculating and motion compensating unit which calculates an adaptive motion vector based on the first and second motion vectors, and then, generates an adaptive motion compensated field by using the calculated adaptive motion vector, the $(k-1)^{th}$ field, and the $(k+1)^{th}$ field.

13. The apparatus of claim 12, wherein if the first motion vector is (dx1, dy1) and the second motion vector is (dx2, dy2), the adaptive motion vector is (dx2/w, dy2/w), where $$w = \frac{\sqrt{dx1^2 + dy1^2}}{\sqrt{dx2^2 + dy2^2}}.$$

14. The apparatus of claim 12, wherein if there is motion of the input picture and the correlation between the first and second motion vectors is larger than a predetermined critical value, the picture converter generates a $k^{th}$ progressive frame by using the $k^{th}$ field and the adaptive motion compensated field.

15. The apparatus of claim 9, wherein if the $k^{th}$ field is an odd field, the phase corrected $k^{th}$ field is an even field, and if the $k^{th}$ field is an even field, the phase corrected $k^{th}$ field is an odd field.

16. A computer readable medium storing computer programs for executing an adaptive de-interlacing method based on a phase corrected field of an input interlaced picture signal, the method comprising:

generating a phase corrected $k^{th}$ field by compensating a phase of the $k^{th}$ field of the input interlaced picture signal by 1 line frequency;

calculating a first motion vector between the phase corrected $k^{th}$ field and a $(k-1)^{th}$ field of the interlaced picture signal;

calculating a second motion vector between the $(k-1)^{th}$ field and a $(k+1)^{th}$ field of the interlaced picture signal; and determining whether there is motion of an input picture based on the first and second motion vector values, and generating a $k^{th}$ progressive frame based on a result of the motion determination and the $k^{th}$ field, where k comprises an integer.

17. The medium of claim 16, wherein if one of the first and second motion vector values is larger than a predetermined critical value, it is determined that there is motion of the input picture, and then, a $k^{th}$ progressive frame is generated by using the phase corrected $k^{th}$ field and the $k^{th}$ field.

18. The medium of claim 16, wherein if the first and second motion vector values are smaller than a predetermined critical value, it is determined that there is no motion of the input picture, and then, a $k^{th}$ progressive frame is generated by using the $(k-1)^{th}$ field and the $k^{th}$ field.

19. The medium of claim 16, further comprising:

generating an adaptive motion vector based on the first and second motion vectors.

20. The medium of claim 19, wherein if the first motion vector is (dx1, dy1) and the second motion vector is (dx2, dy2), the adaptive motion vector is (dx2/w, dy2/w), where $$w = \frac{\sqrt{dx1^2 + dy1^2}}{\sqrt{dx2^2 + dy2^2}}.$$

21. The medium of claim 19, further comprising:

generating an adaptive motion compensated field based on the generated adaptive motion vector, the $(k-1)^{th}$ field and the $(k+1)^{th}$ field.

22. The medium of claim 19, wherein a correlation between the first and second motion vectors is calculated, and then, if the calculated correlation is larger than a predetermined critical value, a progressive frame is generated by using the adaptive motion vector.

23. The medium of claim 16, wherein if the $k^{th}$ field is an odd field, the phase corrected $k^{th}$ field is an even field, and if the $k^{th}$ field is an even field, the phase corrected $k^{th}$ field is an odd field.

* * * * *